(12) United States Patent
Faruque et al.

(10) Patent No.: US 12,545,156 B2
(45) Date of Patent: Feb. 10, 2026

(54) LOWERABLE SEAT MOUNT

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 18/490,095

(22) Filed: Oct. 19, 2023

(65) Prior Publication Data
US 2025/0128648 A1 Apr. 24, 2025

(51) Int. Cl.
*B60N 2/427* (2006.01)
(52) U.S. Cl.
CPC ..... *B60N 2/42718* (2013.01); *B60N 2/42772* (2013.01)
(58) Field of Classification Search
CPC ............ B60N 2/42718; B60N 2/42727; B60N 2/42736; B60N 2/502; B60N 2/504; B60N 2/505
See application file for complete search history.

(56) References Cited

U.S. PATENT DOCUMENTS

| | | | |
|---|---|---|---|
| 6,908,149 B1 | 6/2005 | Yamaguchi et al. | |
| 10,245,987 B2 * | 4/2019 | Castillo | B60N 2/04 |
| 10,773,610 B2 * | 9/2020 | Kim | B60N 2/34 |
| 11,104,252 B2 | 8/2021 | Line et al. | |
| 11,518,278 B2 | 12/2022 | Dry et al. | |

FOREIGN PATENT DOCUMENTS

| | | | |
|---|---|---|---|
| CN | 114683974 B | 4/2023 | |
| JP | 2015081061 A * | 4/2015 | ........... B60N 2/1853 |

* cited by examiner

*Primary Examiner* — Richard G Davis
(74) *Attorney, Agent, or Firm* — Frank A. MacKenzie; Brooks Kushman P.C.

(57) ABSTRACT

A seat support system including a seat mount having multiple segments movable relative to each other between a raised configuration and a lowered configuration. The multiple segments include a first segment attached to a floor of a vehicle and a second segment connected to the first segment. A linear actuator is connected to the second segment and movable from a retracted position to an extended position to move the multiple segments from the raised configuration to the lowered configuration.

20 Claims, 5 Drawing Sheets

LOWERABLE SEAT MOUNT

BACKGROUND

A vehicle may include a seat assembly and a seatbelt assembly. The seat assembly can include a seatback and a seat bottom that can support an occupant of the seat assembly. For example, the occupant of the seat assembly may sit on a top surface of the seat bottom and recline against the seatback. The seatbelt assembly may include a seatbelt retractor and webbing retractably payable from the seatbelt retractor. The seatbelt assembly may include an anchor coupled to the webbing, and a latch plate that engages a buckle. The seatbelt assembly may be disposed adjacent to a seat assembly of the vehicle. The webbing may extend continuously from the seatbelt retractor to the anchor. For example, one end of the webbing feeds into the seatbelt retractor, and the other end of the webbing is fixed to the anchor. The seat assembly and the seatbelt assembly can work in conjunction to control occupant kinematics in the event of certain vehicle impacts.

DETAILED DESCRIPTION

A seat support system includes a seat mount having multiple segments movable relative to each other between a raised configuration and a lowered configuration. The multiple segments include a first segment attached to a floor of a vehicle and a second segment connected to the first segment. A linear actuator is connected to the second segment and movable from a retracted position to an extended position to move the multiple segments from the raised configuration to the lowered configuration.

The seat support system can also include a third segment coupled between the first segment and the second segment. The seat support system can include one or more hinges coupling the multiple segments together. The third segment can be connectable to a seat bottom. The seat support system can also include a seat assembly connected to the seat mount.

The linear actuator can have a first end attached to the floor of the vehicle and a second end connected to the second segment. The linear actuator can be a pyrotechnic device.

The seat mount can be a first seat mount and the seat support system can also include a second seat mount and a transverse member attached to the second segments of the first and second seat mounts. The first and second seat mounts are positioned under a seat rearward portion of a seat bottom. The seat support system can also include one or more forward seat mounts positioned seat forward of the seat mount.

The linear actuator can have a first end attached to the floor of the vehicle and a second end attached to the transverse member. The transverse member can be attached to the floor with frangible fasteners to retain the seat mounts in the raised configuration.

An angle between the seat bottom and the floor is greater in the lowered configuration than the angle is in the raised configuration. The multiple segments can be angled relative to each other in the raised configuration and generally coplanar in the lowered configuration.

The seat support system can include a computer having a processor and a memory storing instructions executable by the processor to activate the linear actuator to move the seat mount from the raised configuration to the lowered configuration in response to certain vehicle impacts.

Figure 1:
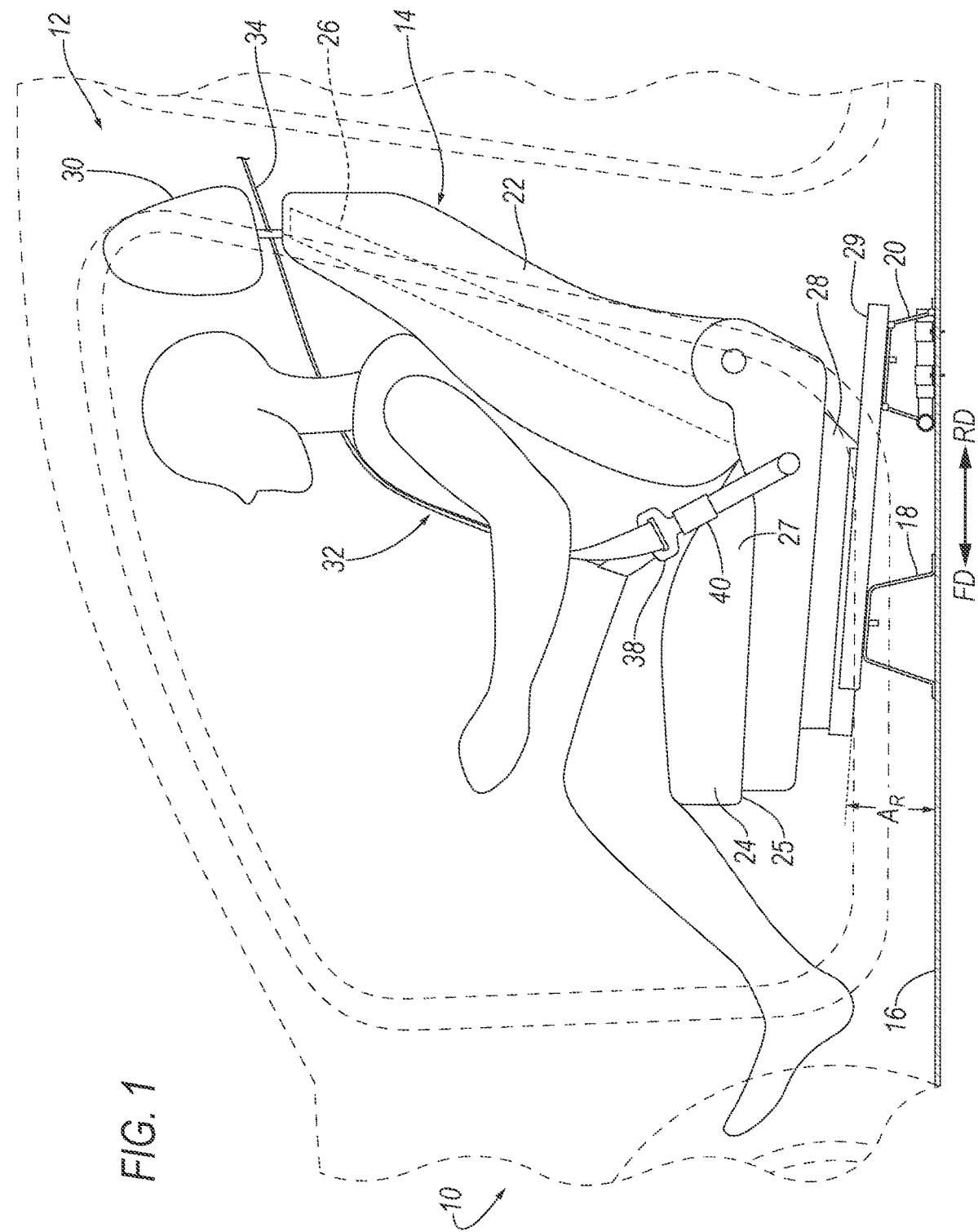
FIG. 1 is a side view of a portion of a vehicle with a seat assembly and a seat support system having a rear seat mount in a raised configuration.
Figure 2:
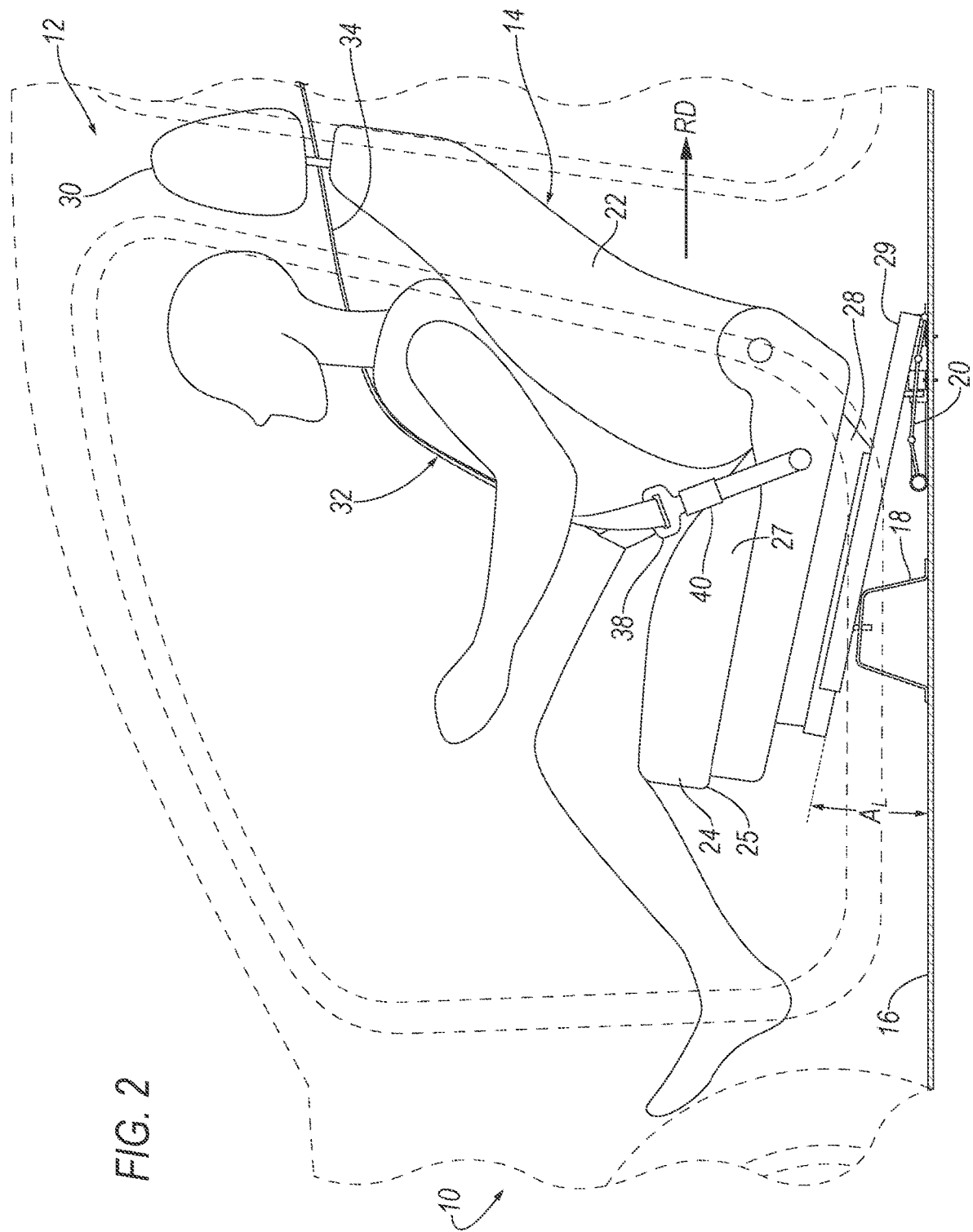
FIG. 2 is a side view of the seat assembly and seat support system shown in FIG. 1 with the rear seat mount in a lowered configuration.

With reference to the Figures, where like numerals indicate like features throughout the several views, an example of a seat support system can include one or more lowerable seat mounts 20 having multiple segments 50, 52, and 54 movable relative to each other between a raised configuration (FIG. 1) and a lowered configuration (FIG. 2). The multiple segments can include a first segment 50 attached to a floor 16 of a vehicle 10, a second segment 52 connected to the first segment 50, and a third segment 54 coupled between the first segment 50 and the second segment 52. A linear actuator 60 can be connected to the second segment 52 and movable from a retracted position (FIG. 3) to an extended position (FIG. 4) to move the multiple segments 50, 52, 54 from the raised configuration to the lowered configuration to tilt the seat assembly 14 in a seat-rearward direction RD. In certain vehicle impacts it may be advantageous to tilt the seat assembly 14 in a seat rearward direction RD to help improve occupant kinematics.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may define a passenger cabin 12 to house occupants, if any, of the vehicle 10. The passenger cabin 12 may extend across the vehicle 10, e.g., from a left side of the vehicle 10 to a right side of the vehicle 10. The passenger cabin 12 includes a front end and a rear end with the front end being in front of the rear end during forward movement of the vehicle 10.

One or more seat assemblies, such as passenger-side seat assembly 14, may be supported in the passenger cabin 12, e.g., by a floor 16 of the vehicle 10. The seat assembly 14 may be supported by a front mount 18 and a rear mount 20. Each seat assembly 14 includes a seatback 22 and a seat bottom 24 that can support the occupant of the seat assembly 14. For example, the occupant of the seat assembly 14 may sit atop a top surface of the seat bottom 24 and recline against the seatback 22.

The seatback 22 may include a seatback frame 26. The seatback frame 26 may include tubes, beams, etc. Specifically, the seatback frame 26 may include a pair of upright frame members. The upright frame members are elongated, and specifically, are elongated in a generally upright direction (e.g., along a seat-vertical axis) when the seatback 22 is in a generally upright position. The upright frame members are spaced from each other in a cross-vehicle direction. The seatback frame 26 may include one or more cross-members extending between the upright frame members.

The seat bottom 24 has a front end 25 and a rear end 27. The front end 25 is seat-forward of the rear end 27 in the seat-forward direction FD. The seat bottom 24 can include a seat bottom frame 28. The frame 28 may include tubes, beams, etc. Specifically, the seat bottom frame 28 may include a pair of frame members 29 elongated in the seat-forward direction FD, e.g., between the front end 25 and the rear end 27 of the seat bottom 24. The frame members 29 can be laterally spaced from each other. The frame 28 may include cross-members extending between the frame members. The frame can include a seat pan. The seat pan may be generally planar and extend from one of the frame members to the other of the frame members. The seat pan may be fixed to the frame members.

The seatback frame 26 and the seat bottom frame 28 may be of any suitable plastic material, e.g., carbon fiber reinforced plastic (CFRP), glass fiber-reinforced semi-finished thermoplastic composite (organosheet), etc. As another example, some or all components of the seatback frame 26 and the seat bottom frame 28 may be formed of a suitable metal, e.g., steel, aluminum, etc. The seatback 22 and the seat bottom 24 can include suitable covers. The covers may include upholstery and padding. The upholstery may be cloth, leather, faux leather, or any other suitable material. The upholstery may be stitched in panels around the frames. The padding may be between the upholstery and the frames. The padding may be foam or any other suitable material.

The seatback 22 is supported by the seat bottom 24 at the rear end 27. The seat bottom 24 extends from the seatback 22 in the seat-forward direction FD of the seat assembly 14. The rear end 27 is proximate to the seatback 22 and the front end 25 is distal from the seatback 22. The seatback 22 may be stationary or movable relative to the seat bottom 24. The seatback 22 and the seat bottom 24 may be adjustable in multiple degrees of freedom. Specifically, the seatback 22 and the seat bottom 24 may themselves be adjustable, in other words, adjustable components within the seatback 22 and/or the seat bottom 24, and/or may be adjustable relative to each other.

The seat assembly 14 may include a head restraint 30. The head restraint 30 may be supported by the seatback 22. The head restraint 30 may be at a top end of the seatback 22. The head restraint 30 may be stationary or movable relative to the seatback 22. The seatback 22 and the head restraint 30 may be adjustable in multiple degrees of freedom. Specifically, the seatback 22 and/or the head restraint 30 may themselves be adjustable and/or may be adjustable relative to each other.

A seatbelt assembly 32 is associated with each seat assembly 14. The seatbelt assembly 32 can include a retractor (not shown) and a webbing 34. The webbing 34 is retractably payable from the retractor. The seatbelt assembly 32 may include an anchor (not visible) fixed to the webbing 34 and a latch plate 38 that engages a buckle 40. The webbing 34 may extend continuously from the retractor to the anchor. The latch plate 38 may slide freely along the webbing 34, and when engaged with the buckle 40, divide the webbing 34 into a lap belt and a shoulder belt. The webbing 34 may be fabric, e.g., polyester.

As shown in FIGS. 1 and 2, the seat assembly 14 is supported on one or more forward seat mounts 18 positioned under the front end 25 of the seat bottom 24 and one or more lowerable seat mounts 20 positioned under the back end 27 (e.g., a seat rearward portion) of the seat bottom 24. Thus, the forward seat mounts 18 are positioned seat forward of the seat mounts 20.

The seat mounts 20 can have multiple segments and are movable between a raised configuration, as shown in FIG. 1, and a lowered configuration, as shown in FIG. 2. An angle $A_L$ between the seat bottom 24 and the floor 16 is greater in the lowered configuration than the angle $A_R$ is when the seat mounts 20 are in the raised configuration. In other words, $A_L > A_R$ when the seat mounts 20 are in the lowered configuration. Accordingly, when the seat mounts 20 are in the lowered configuration (FIG. 2) the seat assembly 14 is tilted or angled in the seat-rearward direction RD. In certain vehicle impacts it may be advantageous to tilt the seat assembly 14 in the seat rearward direction RD to help improve occupant kinematics.

Figure 3:
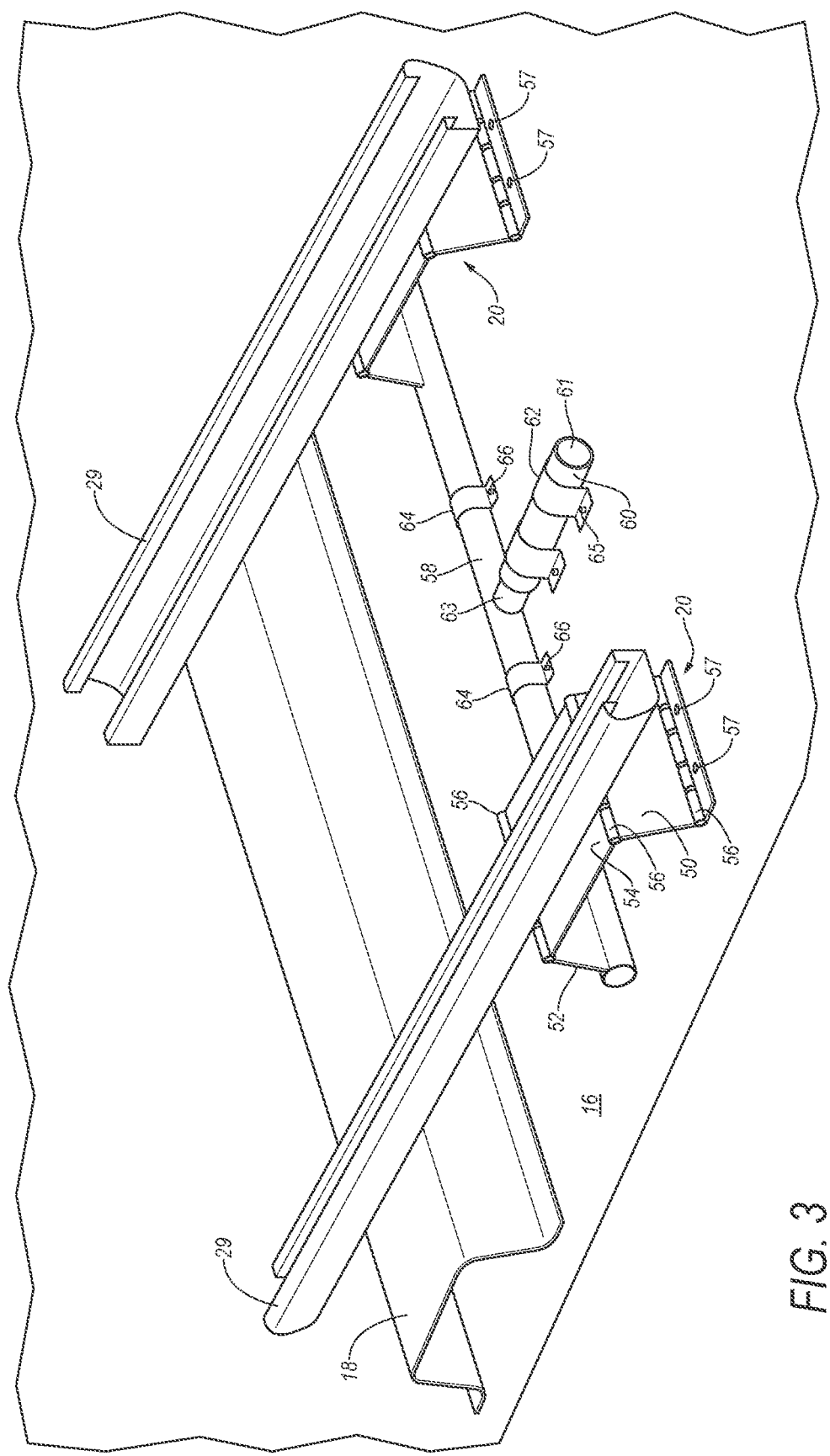
FIG. 3 is a perspective view of the seat support system with the rear seat mount in the raised configuration.

With reference to FIG. 3, the seat mounts 20 can have multiple segments, e.g., 50, 52, and 54, that are movable relative to each other between the raised configuration and the lowered configuration. The segments can include a first segment 50 attached to the floor 16 of the vehicle 10, a second segment 52 connected to the first segment 50, and a third segment 54 coupled between the first segment 50 and the second segment 52. In an example, the third segment 54 is connectable to the seat bottom 24 via the frame members 29 of seat bottom frame 28. The seat mounts 20 can have fewer segments or more segments than depicted herein. For example, the seat mount can have a trapezoidal configuration with the three segments 50, 52, 54 as shown in the figures or, it may have a triangular configuration with only two segments, e.g., 50 and 52. Furthermore, in some examples, a single rear mount having multiple segments, or panels, can be used.

The seat mounts 20 can include one or more hinges 56 coupling the segments together. The multiple segments are angled relative to each other in the raised configuration and are generally coplanar, or lie flat, in the lowered configuration (e.g., FIGS. 2 and 4). In other words, the angles between the segments are increased in the lowered configuration relative to the raised configuration. For example, in the lowered configuration the angles between the segments can approach 180 degrees. As mentioned, the first segment 50 includes a hinge 56, a portion of which can be attached to the floor 16 with suitable fasteners 57 or welds, e.g., spot welds. In alternative examples, the segments can be connected with thin sections of sheet metal and/or perforations along bend lines between the segments.

An actuator, such as linear actuator 60, can be connected to the second segment 52 and movable from a retracted position (FIG. 3) to an extended position (FIG. 4) to move the multiple segments from the raised configuration to the lowered configuration, respectively. The linear actuator 60 can have a first end 61 attached to the floor 16 of the vehicle and a second end 63 connected to the second segment. In an example, the linear actuator 60 can be a pyrotechnic device. The first end of the linear actuator 60 can be attached to the floor 16 with brackets 62 and suitable fasteners 65, for example.

In the depicted example, the second end 63 of the linear actuator 60 is connected to the second segments 52 of the seat mounts 20 via a transverse member 58 attached to the second segments 52 of the seat mounts 20. The transverse member 58 can be attached to the floor with brackets 64 and frangible fasteners 66 to retain the seat mounts 20 in the raised configuration.

Figure 4:
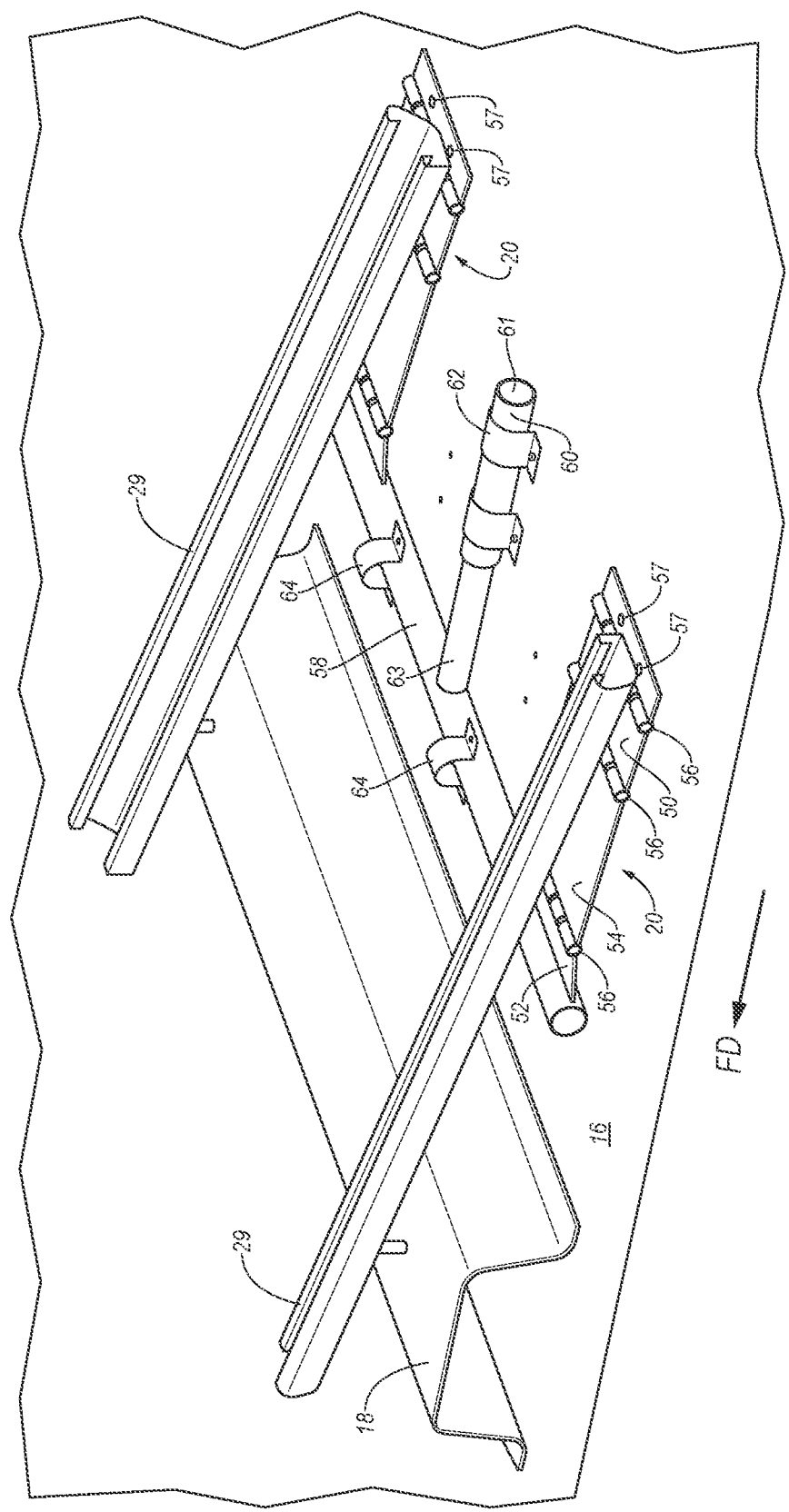
FIG. 4 is a perspective view of the seat support system with the rear seat mount in the lowered configuration.

With reference to FIG. 4, when the linear actuator 60 is extended, the frangible fasteners 66 are designed to separate from the brackets 64 and/or the floor 16 allowing the transverse member 58 to move in the seat forward direction FD. The transverse member 58 along with the second segments 52 are urged in the seat forward direction FD by the force from the linear actuator 60 as well as the combined weight of the seat assembly 14 and the occupant. The brackets 64 can partially or completely separate from the floor 16 as shown in FIG. 4.

The frangible fasteners 66 can be e.g., frangible screws and may be metal, plastic, or composite. The frangible fasteners 66 may have varying cross-sectional dimensions to provide a designed resistance to shearing, beyond which the fastener shears and releases the brackets 64 and transverse member 58 to move in the seat forward direction FD. In some examples, the frangible fasteners 66 may be plastic rivets, panel fasteners, and the like.

Figure 5:
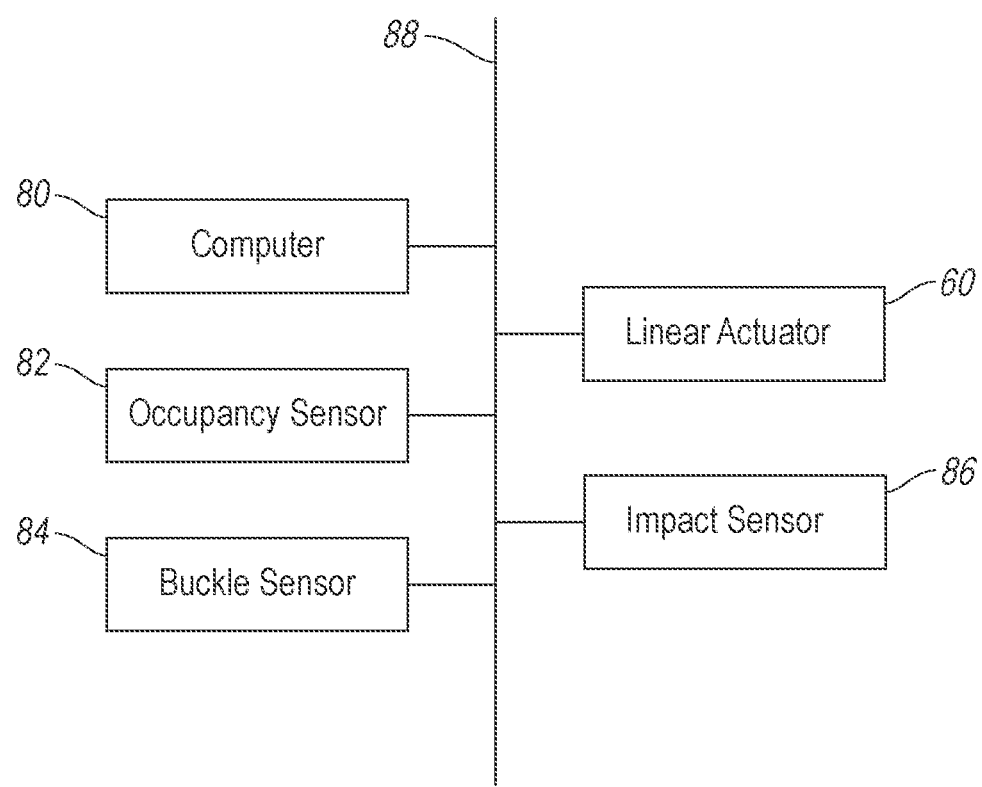
FIG. 5 is a block diagram of a system of the vehicle.

With reference to FIG. 5, a seat support system can include the seat mounts 20 and the linear actuator 60, as well as a computer 80, a network 88, and various sensors, including an occupancy sensor 82, a buckle sensor 84, and an impact sensor 86. The vehicle 10 may include an occupancy sensor 82 configured to detect occupancy of the seat assembly 14. The occupancy sensor 82 may include visible-light or infrared cameras directed at the seat, weight sensors supported by the seat bottom 24, or other suitable structure, including those conventionally known. The occupancy sensor 82 provides data to the computer 80 indicating whether the seat assembly 14 is occupied or unoccupied.

The vehicle 10 may include a buckle sensor 84 that detects engagement of the latch plate 38 of the seatbelt assembly 32 with the buckle 40. The buckle sensor 84 may include a switch, a contact sensor, a hall effect sensor, or any other suitable structure for detecting engagement of the latch plate 38 with the buckle 40, including conventional structures. The buckle sensor 84 provides data to the computer 80 indicating whether the latch plate 38 is engaged with, or disengaged from, the buckle 40.

The vehicle 10 may include at least one impact sensor 86 for sensing certain vehicle impacts (e.g., impacts of a certain magnitude, direction, etc.). The vehicle computer 80 may activate the linear actuator 60, e.g., provide an impulse to a pyrotechnic charge of the actuator 60, when the impact sensor 86 senses certain vehicle impacts. Alternatively or additionally to sensing certain vehicle impacts, the impact sensor 86 may be configured to sense certain vehicle impacts prior to impact, i.e., pre-impact sensing. The impact sensor 86 is configured to detect certain vehicle impacts. In other words, a "certain vehicle impact" is an impact of the type and/or magnitude for which activation of the linear actuator 60 is designed i.e., "certain" indicates the type and/or magnitude of the impact. The type and/or magnitude of such "certain vehicle impacts" may be pre-stored in the computer 80, e.g., a restraints control module and/or a body control module. The impact sensor 86 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 86 may be located at numerous points in or on the vehicle 10.

The vehicle 10 may include a communication network 88. The communication network 88 includes hardware, such as a communication bus, for facilitating communication among vehicle components, e.g., the computer 80, the occupancy sensor 82, the buckle sensor 84, the impact sensor 86, the linear actuator 60, etc. The communication network 88 may facilitate wired or wireless communication among the vehicle components in accordance with a number of communication protocols such as controller area network (CAN), Ethernet, Wi-Fi, Local Interconnect Network (LIN), and/or other wired or wireless mechanisms. Alternatively or additionally, in cases where the computer 80 comprises a plurality of devices, the communication network 88 may be used for communications between devices represented as the computer 80 in this disclosure.

The computer 80 may be a microprocessor-based computer implemented via circuits, chips, or other electronic components. The computer 80 includes a processor, a memory, etc. The memory of the computer 80 may include memory for storing programming instructions executable by the processor as well as for electronically storing data and/or databases. For example, the computer 80 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 80 may be a restraints control module. In another example, computer 80 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 80. The memory can be of any type, e.g., hard disk drives, solid state drives, servers, or any volatile or non-volatile media. The memory can store the collected data sent from the sensors.

The computer 80 is programmed to, i.e., the memory stores instructions executable by the processor to, command the actuator 60 to move the lowerable seat mounts 20 from the raised configuration to the lowered configuration. The computer 80 may move the seat mounts 20 by transmitting an impulse to a pyrotechnic charge of the actuator 60 via the communication network 88. The computer 80 may be programmed to move the seat mounts 20 to the lowered configuration in response to detecting certain vehicle impacts. The computer 80 may determine that a certain vehicle impact has occurred or may occur based on information received from the impact sensor 86 via the communication network 88.

The computer 80 may determine that the seat assembly 14 is occupied based on information received from the occupancy sensor 82 via the communication network 88. In an example, the computer 80 may be programmed to move the seat mounts 20 to the lowered configuration in response to detecting certain vehicle impacts and when the computer 80 has determined that the seat assembly 14 is occupied.

The computer 80 may determine that the latch plate 38 of the seatbelt assembly 32 is engaged with the buckle 40 based on information received from the buckle sensor 84 via the communication network 88. In an example, the computer 80 may be programmed to move the seat mounts 20 to the lowered configuration in response to detecting certain vehicle impacts and when the computer 80 has determined that the latch plate 38 is engaged with the buckle 40.

The computer 80 may determine that the seat assembly 14 is occupied and that the latch plate 38 of the seatbelt assembly 32 is engaged with the buckle 40. In another example, the computer 80 may be programmed to move the seat mounts 20 to the lowered configuration in response to detecting certain vehicle impacts and when the computer 80 has determined that the seat assembly 14 is occupied and the latch plate 38 is engaged with the buckle 40.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory.

The adjectives first, second, etc., are used throughout this document as identifiers and, unless explicitly stated otherwise, are not intended to signify importance, order, or quantity.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat support system, comprising:
   a seat mount having multiple segments movable relative to each other between a raised configuration and a lowered configuration, the multiple segments including:
   a first segment attached to a floor of a vehicle; and
   a second segment connected to the first segment; and
   a linear actuator connected to the second segment and movable from a retracted position to an extended position to move the multiple segments from the raised configuration to the lowered configuration, the linear actuator being a pyrotechnic device.

2. The seat support system of claim 1, further comprising a third segment coupled between the first segment and the second segment.

3. The seat support system of claim 2, wherein the third segment is connectable to a seat bottom.

4. The seat support system of claim 1, further comprising one or more hinges coupling the multiple segments together.

5. The seat support system of claim 1, wherein the linear actuator has a first end attached to the floor of the vehicle and a second end connected to the second segment.

6. The seat support system of claim 1, further comprising a seat assembly connected to the seat mount.

7. The seat support system of claim 1, wherein the seat mount is a first seat mount and further comprising a second seat mount and a transverse member attached to the second segments of the first and second seat mounts.

8. The seat support system of claim 7, wherein the linear actuator has a first end attached to the floor of the vehicle and a second end attached to the transverse member.

9. The seat support system of claim 7, wherein the transverse member is attached to the floor with frangible fasteners to retain the seat mounts in the raised configuration.

10. The seat support system of claim 7, wherein the first and second seat mounts are positioned under a seat rearward portion of a seat bottom, and an angle between the seat bottom and the floor is greater in the lowered configuration than the angle is in the raised configuration.

11. The seat support system of claim 1, wherein the multiple segments are angled relative to each other in the raised configuration and generally coplanar in the lowered configuration.

12. The seat support system of claim 1, further comprising a computer having a processor and a memory storing instructions executable by the processor to activate the linear actuator to move the seat mount from the raised configuration to the lowered configuration in response to certain vehicle impacts.

13. The seat support system of claim 1, further comprising a third segment coupled between the first segment and the second segment and wherein the seat mount is a first seat mount and further comprising a second seat mount.

14. The seat support system of claim 13, further comprising a transverse member attached to the second segments of the first and second seat mounts.

15. The seat support system of claim 14, wherein the linear actuator has a first end attached to the floor of the vehicle and a second end attached to the transverse member.

16. The seat support system of claim 15, wherein the transverse member is attached to the floor with frangible fasteners to retain the seat mounts in the raised configuration.

17. The seat support system of claim 16, wherein the multiple segments are angled relative to each other in the raised configuration and generally coplanar in the lowered configuration.

18. A seat support system, comprising:
   a seat mount having multiple segments movable relative to each other between a raised configuration and a lowered configuration, the multiple segments including:
   a first segment attached to a floor of a vehicle;
   a second segment connected to the first segment; and
   a third segment coupled between the first segment and the second segment;
   a linear actuator connected to the second segment and movable from a retracted position to an extended position to move the multiple segments from the raised configuration to the lowered configuration.

19. The seat support system of claim 18, wherein the third segment is connectable to a seat bottom.

20. A seat support system, comprising:
   a seat mount having multiple segments movable relative to each other between a raised configuration and a lowered configuration, the multiple segments including:
   a first segment attached to a floor of a vehicle; and
   a second segment connected to the first segment;
   the multiple segments being angled relative to each other in the raised configuration and generally coplanar in the lowered configuration; and
   a linear actuator connected to the second segment and movable from a retracted position to an extended position to move the multiple segments from the raised configuration to the lowered configuration.

* * * * *